(12) United States Patent
Hartley et al.

(10) Patent No.: US 9,143,611 B2
(45) Date of Patent: Sep. 22, 2015

(54) SYSTEM AND METHOD FOR ROUTING CALLS

(75) Inventors: John B. Hartley, North Fitzroy (AU); Jessie Yu, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 930 days.

(21) Appl. No.: 12/241,206

(22) Filed: Sep. 30, 2008

(65) Prior Publication Data

US 2010/0080376 A1    Apr. 1, 2010

(51) Int. Cl.
*H04M 3/42* (2006.01)
*H04M 3/54* (2006.01)
*H04M 3/436* (2006.01)
*H04M 7/12* (2006.01)

(52) U.S. Cl.
CPC ............ *H04M 3/42* (2013.01); *H04M 3/42348* (2013.01); *H04M 3/42374* (2013.01); *H04M 3/436* (2013.01); *H04M 3/54* (2013.01); *H04M 3/541* (2013.01); *H04M 7/1205* (2013.01); *H04M 2203/2011* (2013.01); *H04M 2203/2038* (2013.01)

(58) Field of Classification Search
CPC ....... H04M 3/54; H04M 3/541; H04M 3/436; H04M 3/42; H04M 3/42348
USPC .................. 379/211.01, 211.02, 88.16, 88.25
See application file for complete search history.

(56) References Cited

U.S. PATENT DOCUMENTS

| | | |
|---|---|---|
| 5,327,486 A | 7/1994 | Wolff et al. |
| 5,818,920 A | 10/1998 | Rignell et al. |
| 6,138,008 A | 10/2000 | Dunn et al. |
| 6,600,817 B1 | 7/2003 | Shaffer et al. |
| 6,751,483 B1 | 6/2004 | Oh |
| 6,853,711 B2* | 2/2005 | Brisebois et al. ........ 379/142.06 |
| 6,934,543 B2 | 8/2005 | Wang et al. |
| 7,286,658 B1 | 10/2007 | Henderson |
| 2001/0036252 A1* | 11/2001 | Renner et al. ................. 379/67.1 |
| 2002/0118807 A1* | 8/2002 | Pedersen .................. 379/142.01 |
| 2003/0112945 A1 | 6/2003 | Brown et al. |
| 2003/0161451 A1* | 8/2003 | Fitzpatrick et al. ........ 379/88.22 |
| 2004/0249649 A1* | 12/2004 | Stratton et al. ..................... 705/1 |
| 2005/0008137 A1 | 1/2005 | Naito |
| 2005/0070282 A1 | 3/2005 | Hinz |
| 2005/0220288 A1 | 10/2005 | Huey |
| 2006/0146997 A1* | 7/2006 | Qian et al. ................. 379/88.16 |

(Continued)

FOREIGN PATENT DOCUMENTS

WO    WO9422259    9/1994

OTHER PUBLICATIONS

U.S. Appl. No. 12/261,180, filed Oct. 30, 2008.

(Continued)

*Primary Examiner* — Sonia Gay
(74) *Attorney, Agent, or Firm* — George R. McGuire; John Pivnichny; Bond Schoeneck & King, PLLC

(57) ABSTRACT

A method and system of routing telephone calls from a calling party to a called party including placing a call to a called party, accessing context information associated with the called party, permitting the calling party to opt to continue with the call or terminate the call based on the accessed context information, wherein continuing with the call comprises connecting the call to the called party or selecting a redirection option with the call.

5 Claims, 2 Drawing Sheets

(56) References Cited

U.S. PATENT DOCUMENTS

| | | | |
|---|---|---|---|
| 2006/0193451 A1* | 8/2006 | Sharma | 379/88.16 |
| 2006/0210032 A1 | 9/2006 | Grech et al. | |
| 2006/0210033 A1* | 9/2006 | Grech et al. | 379/88.19 |
| 2006/0245558 A1* | 11/2006 | Gatzke et al. | 379/88.16 |
| 2007/0025530 A1* | 2/2007 | Tidwell et al. | 379/88.25 |
| 2007/0036284 A1* | 2/2007 | Raghav et al. | 379/67.1 |
| 2007/0081640 A1* | 4/2007 | Jachner | 379/88.16 |
| 2007/0248220 A1 | 10/2007 | Crandell et al. | |
| 2007/0248230 A1 | 10/2007 | Shevmov et al. | |
| 2008/0091786 A1* | 4/2008 | Jhanji | 709/206 |
| 2008/0240385 A1* | 10/2008 | Mikhailov | 379/88.25 |
| 2009/0136015 A1* | 5/2009 | Roberts | 379/210.02 |
| 2009/0238353 A1* | 9/2009 | Mani | 379/201.02 |
| 2010/0111276 A1 | 5/2010 | Hartley et al. | |

OTHER PUBLICATIONS

Dongmei Jiang, et al., "Personalization for SIP Multimedia Communications with Presence." 2005 International Conference on Services Systems and Services Management (IEEE Cat. No. 05EX1010), 2005, pt. 2, 1365-8 vol. 2.

Allen E. Milewski, et al., "Providing Presence Cues to Telephone Users," http://web.mit.edu/bently/www/mobile/papers/presencecues.pdf.

Bessler, Sanford et al., "A Privacy Enchanced Service Architecture for Mobile Users", Proceedings of the 3rd International Conference on Pervasive Computing and Communications Workshops, Mar. 8-12, 2005, pp. 125-129.

* cited by examiner

SYSTEM AND METHOD FOR ROUTING CALLS

FIELD OF THE INVENTION

The present invention relates generally to telephony systems and methods of use and particularly to a method and system for routing telephone calls.

BACKGROUND

Voice telephony has been known for many years. Initially, voice telephony was supported by dedicated conductors between telephones. Then, voice telephony was enabled by operators manually switching connectors to create and tear down circuits between telephones. As technology advanced, mechanical components performed the switching operations to create and tear down circuits between telephones. With advancing technology, computers and semiconductor components replaced the mechanical components to perform circuit switching duties. Networks created using this circuit-switched technology are generally known as the Public Switched Telephone Network (PSTN). Generally, the PSTN provides a circuit-switched, time-divided connection between telephones.

Packet data communications, such as those supported by the Internet, differ from circuit-switched communications. With packet data communications, a source device forms a data packet, transmits the data packet to a packet data network, and based upon a destination address, e.g., Internet Protocol (IP) address of the data packet, the packet data network passes the data packet to a destination device. As the Internet and other packet data networks grew in popularity, packet switched voice telephony was developed. One common type of packet switched voice telephony is Voice over Internet Protocol (VoIP) telephony. When VoIP telephony was first introduced, the data packet transmission latency of the Internet and of other servicing networks caused the quality of VoIP telephony to be significantly worse than that of PSTN telephony. Over time, packet data transmission latency of the Internet and of other servicing packet data networks has decreased. Now, VoIP telephony provides service quality equal to or better than PSTN telephony in many cases.

Recently developed VoIP telephony applications enable computer users to establish non-toll VoIP telephone calls across the Internet. Compared to PSTN telephony VoIP telephony of this type is significantly less expensive, particularly for overseas calls. However, only a limited number of people have a computer upon which this VoIP telephony application may be loaded and have Internet access of a quality that will support the VoIP telephony application.

The underpinning of the Next Generation Network is Internet Protocol with Multi-Protocol Layer Switching (IP/IMPLS). Thus, the traditional PSTN is becoming a network edge access point into the IP/MPLS network via PSTN/VoIP gateways, built on top of a Session Initiation Protocol (SIP), Real-Time Transport Protocol (RTP) or other internet standard. Moreover, ENUM-based directories that allow mapping of traditional phone numbers to IP Uniform Resource Identifiers (URIs) enable telecommunications service providers to provide new personal mobility solutions. People can use a single phone number and control how the call gets directed to either an IP termination point, an arbitrary telephone number, a wireless (cellular) roaming phone or potentially any of a number of alternate contact points.

Due to the range of possible outcomes that come from dialing a phone number, the calling party needs to have some way of controlling the call routing behavior. It would be beneficial for the calling party to get information regarding the called party, such as the location of the called party, convenient times to contact the called party, and/or which of a series of contact points the call should be directed to. Furthermore, the calling party needs to be made aware of any potential new charges that can incur from selecting one of the available options.

In current scenarios, it is possible to redirect phone numbers to other phone numbers (typically within one's own geography) and it is also possible to have a Global System For Mobile Communication (GSM) (or other cellular wireless) service that provides a global roaming capability, however in both cases the call is transparently routed whether to the requested number or across the visited wireless network and any charges for such a service are charged to the called party, not to the calling party.

U.S. Patent Application No. 2006/0210032 is directed to a method for communicating between a calling party and a called party. The method includes receiving information indicative of an incoming call form the calling party, accessing context information associated with the called party, and accessing a pass code provided by the calling party. The method includes disposing of the incoming call based on the pass code and the context information. The method does not allow the calling party to have discretion to select whether he wishes to disturb the called party by making the call go through or electing to leave a message or return identification to allow the called party to return the call at a later time.

It is a primary object to provide a communications system and method that provides a calling party with options and flexibility regarding the direction of a call. It is a further object to provide a communications system and method that provides a calling party with the option of making a call from a PSTN telephone to a telephone using VoIP telephone service.

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

SUMMARY

According to one embodiment of the present invention, a method of routing telephone calls from a calling party to a called party is provided including placing a call to a called party, accessing context information associated with the called party, permitting the calling party to opt to continue with the call or terminate the call based on the accessed context information, wherein continuing with the call comprises connecting the call to the called party or selecting a redirection option with the call.

In another aspect of the method, the context information includes presence information, temporal information, spatial information and availability. The temporal information may include the time of the call at the called party's location and/or the time zone of the location of the called party. The spatial information may include the current location of the called party and/or the length of time the called party is at the current location.

In a further aspect, the method includes permitting the called party to receive information indicative of the calling party.

In still another aspect, the method includes providing redirection options to the calling party from the called party dependent on the identity of the calling party.

In yet a further aspect of the method, the redirection option includes leaving a voicemail message in the called party's inbox; forwarding the call to the location and number of the called party to connect to the called party; inputting a callback number in the called party's inbox, or talking to the called party's answering service.

In still a further aspect, the method includes providing information regarding potential charges to the calling party.

According to another embodiment of the present invention, a system for routing telephone calls from a calling party to a called party is provided including at least a first communications device, at least a second communications device, a gateway connected to the first communications device and the second communications device, an ENUM database connected to the gateway, an SIP server connected to the gateway, a presence server connected to the SIP server, and an IP call termination node connected to the gateway and the second communication device.

In a further aspect, the system includes a voice response unit linked to the first communications device and to the gateway.

In another aspect of the system, the first communications device includes a Public Switched Telephone Network (PSTN) telephone, a cellular telephone, a landline telephone, a computer and a video conferencing device.

In yet another aspect of the system, the second communications device includes a PSTN telephone, Session Initiation Protocol (SIP) telephone, a wireless telephone, or a computer device.

In still a further aspect of the system, the IP call termination node includes a Session Initiation Protocol (SIP) terminal, a gateway or a digital voice message system.

In another aspect of the system, the gateway includes a PSTN/VoIP gateway.

In yet another aspect, the system includes one or more networks.

In a further aspect, the system includes one or more networks. The networks include wired and wireless networks.

According to another embodiment of the present invention, a system to route a telephone call from a calling party to a called party is provided, including instructing a gateway to obtain the called party's SIP information, instructing the gateway to access context information related to called party's SIP information, instructing the gateway to send the context information to the calling party, whereupon with the receipt of the context information, the calling party is provided with a number of options of managing the call to the calling party.

According to further embodiment of the present invention, a computer program product encoded in a computer readable medium is provided for instructing a system to route a telephone call from a calling party to a called party including instructing a gateway to obtain the called party's SIP information, instructing the gateway to access context information related to called party's SIP information, instructing the gateway to send the context information to the calling party, whereupon with the receipt of the context information, the calling party is provided with a number of options of managing the call to the called party.

In another aspect, the computer program product includes instructing a proxy to identify the calling party.

In a further aspect of the computer program product, the options of managing the call include connecting to the called party, leaving a voice message for the called party, talking to the called party's answering service, forwarding the call to an alternate number, and terminating the call.

In yet another aspect, the computer program product includes instructing a proxy to provide information regarding potential charges to the calling party.

DETAILED DESCRIPTION

Figure 1:
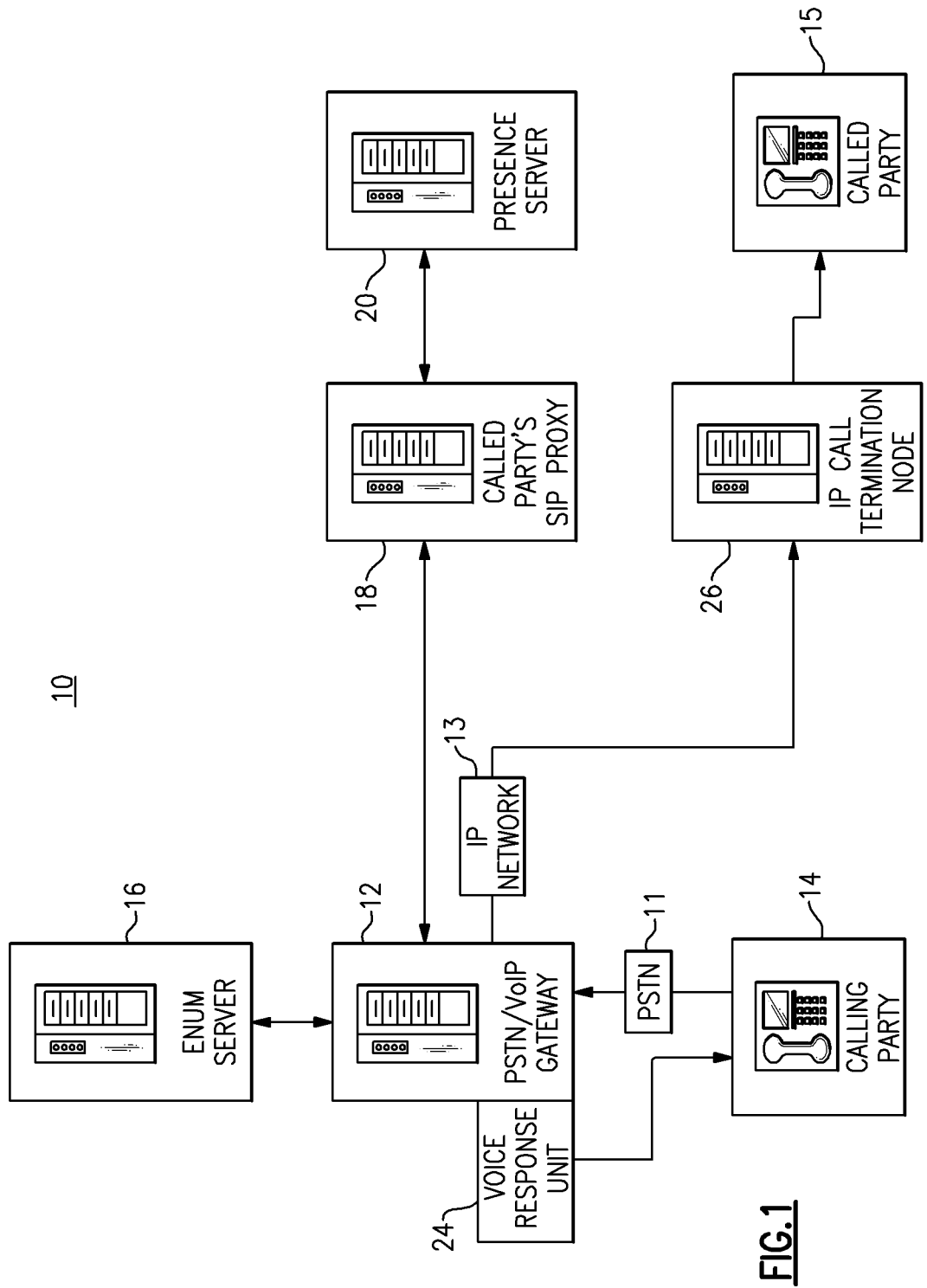
FIG. 1 shows a schematic diagram of an embodiment of a system of the invention.

For the purposes of this patent description and claims, the inventors intend that the following terms be understood to have the following definitions.

"Present invention" means at least some embodiments of the present invention; references to various feature(s) of the "present invention" throughout this document do not mean that all claimed embodiments or methods include the referenced feature(s).

"ENUM" means Telephone Number Mapping (from TElephone NUmber Mapping) and is a suite of protocols to unify the telephone numbering system E.164 with the Internet addressing system DNS by using an indirect lookup method to obtain NAPTR records. Although it facilitates calling VoIP users from IP and PSTN networks, ENUM is not a VoIP function and should not be confused with common VoIP routing based on SIP, H.323 or IAX protocols with a Uniform Resource Identifier (URI). If a calling party being at the PSTN network dials a called party ENUM number by touch typing the E.164 called party number, the number will be translated at the ENUM gateway into the corresponding URI. This URI will be used to look-up and fetch the NAPTR record obtaining the called party wishes about how the call should be forwarded or terminated (either on IP or on PSTN terminations)—the so-called access information—which the registrant (the called party) has specified by writing his/her choice at the 'NAPTR record', "Naming Authority Pointer Resource Records," such as e-mail addresses, a fax number, a personal website, a VoIP number, mobile telephone numbers, voice mail systems, IP-telephony addresses, web pages, GPS coordinates, call diversions or instant messaging. Alternately, when the calling party is at the IP side, the User Agent (UA) piece of software of the dialler will allow to dial an E.164 number, but the dialer UA will convert it into a URI, to be used to look-up at the ENUM gateway DNS and fetch the NAPTR record obtaining the called party wishes about how the call should be forwarded or terminated (again, either on IP or on PSTN terminations).

"DNS" means the Domain Name System that associates various information with domain names; most importantly, it serves as the "phone book" for the Internet by translating human-readable computer hostnames, e.g. www.example.com, into IP addresses, e.g. 208.77.188.166, which networking equipment needs to deliver information. A DNS also stores other information such as the list of mail servers that accept email for a given domain. By providing a worldwide keyword-based redirection service, the Domain Name System is an essential component of contemporary Internet use.

"URI" means Uniform Resource Identifier. It is a compact string of characters used to identify or name a resource on the Internet. The main purpose of this identification is to enable interaction with representations of the resource over a network, typically the World Wide Web, using specific protocols. URIs are defined in schemes defining a specific syntax and associated protocols. A URI may be classified as a locator (URL) or a name (URN), or both. A Uniform Resource Name (URN) is like a person's name, while a Uniform Resource Locator (URL) is like his or her street address. The URN defines an item's identity, while the URL provides a method for finding it.

"E.164" means the international public telecommunication numbering plan used in the PSTN and some other data networks. It also defines the format of telephone numbers. E.164 numbers can have a maximum of 15 digits and are usually written with a + prefix. To actually dial such numbers from a normal fixed line phone the appropriate international call prefix must be used.

"NAPTR" means Naming Authority Pointer and is a newer type of DNS record that supports regular expression based rewriting.

"PSTN" means Public Switched Telephone Network and is the network of the world's public circuit-switched telephone networks, in much the same way that the Internet is the network of the world's public IP-based packet-switched networks. Originally a network of fixed-line analog telephone systems, the PSTN is now almost entirely digital, and now includes mobile as well as fixed telephones. The PSTN is largely governed by technical standards created by the ITU-T, and uses E.163/E.164 addresses (more commonly known as telephone numbers) for addressing.

"VoIP" means Voice-over-Internet Protocol and is a protocol optimized for the transmission of voice through the Internet or other packet-switched networks. VoIP is often used abstractly to refer to the actual transmission of voice (rather than the protocol implementing it). This latter concept is also referred to as IP telephony, Internet telephony, voice over broadband, broadband telephony, and broadband phone. VoIP-to-VoIP phone calls are sometimes free, while VoIP calls connecting to public switched telephone networks (VoIP-to-PSTN) may have a cost that is borne by the VoIP user. Voice-over-IP systems carry telephony signals as digital audio, typically reduced in data rate using speech data compression techniques, encapsulated in a data-packet stream over IP. There are two types of PSTN-to-VoIP services: Direct inward dialing (DID) and access numbers. DID will connect a caller directly to the VoIP user, while access numbers require the caller to provide an extension number for the called VoIP user.

"IP" means Internet Protocol and is a protocol used for communicating data across a packet-switched internetwork using the Internet Protocol Suite (TCP/IP). IP is the primary protocol in the Internet Layer of the Internet Protocol Suite and has the task of delivering datagrams (packets) from the source host to the destination host solely based on its address. For this purpose the Internet Protocol defines addressing methods and structures for datagram encapsulation. The first major version of addressing structure, now referred to as Internet Protocol Version 4 (IPv4) is still the dominant protocol of the Internet, although the successor, Internet Protocol Version 6 (IPv6) is actively deployed world-wide.

"MPLS" means Multi Protocol Label Switching and is a data-carrying mechanism that belongs to the family of packet-switched networks. MPLS operates at an OSI Model layer that is generally considered to lie between traditional definitions of Layer 2 (Data Link Layer) and Layer 3 (Network Layer), and thus is often referred to as a "Layer 2.5" protocol. It was designed to provide a unified data-carrying service for both circuit-based clients and packet-switching clients which provide a datagram service model. It can be used to carry many different kinds of traffic, including IP packets, as well as native ATM, SONET, and Ethernet frames.

"OSI Model" means the Open Systems Interconnection Basic Reference Model and is an abstract description for layered communications and computer network protocol design. It was developed as part of the Open Systems Interconnection (OSI) initiative. In its most basic form, it divides network architecture into seven layers which, from top to bottom, are the Application, Presentation, Session, Transport, Network, Data-Link, and Physical Layers. It is therefore often referred to as the OSI Seven Layer Model.

"SIP" means the Session Initiation Protocol (SIP) and is a signaling protocol, widely used for setting up and tearing down multimedia communication sessions such as voice and video calls over the Internet. Other feasible application examples include video conferencing, streaming multimedia distribution, instant messaging, presence information and online games. SIP was accepted as a 3GPP signaling protocol and permanent element of the IMS architecture for IP based streaming multimedia services in cellular systems. The protocol can be used for creating, modifying and terminating two-party (unicast) or multiparty (multicast) sessions consisting of one or several media streams. The modification can involve changing addresses or ports, inviting more participants, adding or deleting media streams, etc. The SIP protocol is situated at the session layer in the OSI model, and at the application layer in the TCP/IP model. SIP is designed to be independent of the underlying transport layer; it can run on Transmission Control Protocol (TCP), and User Datagram Protocol (UDP), or (Stream Control Transmission Protocol) SCTP. SIP has the following characteristics: (i)Transport-independent, because SIP can be used with UDP, TCP, SCTP, etc.; and (ii) Text-based, allowing for humans to read and analyze SIP messages.

"NGN" means Next Generation Networking and is a broad term to describe some key architectural evolutions in telecommunication core and access networks. The general idea behind NGN is that one network transports all information and services (voice, data, and all sorts of media such as video) by encapsulating these into packets, like it is on the Internet. NGNs are commonly built around the Internet Protocol, and therefore the term "all-IP" is also sometimes used to describe the transformation towards NGN.

Embodiments of the present invention provide a system and method for controlling the routing of telephone calls. Reference is made to FIG. 1, which shows an embodiment of a system 10 herein. System 10 is a communications system having one or more networks, 11 and 13, which may be wired or wireless. Examples of wired networks include, but are not limited to, internets, intranets, plain old telephone service (POTS) networks, and PSTN. Examplary wireless protocols include, but are not limited to, Universal Mobile Telecommunication System (UMTS) protocols, Global System for Mobile telecommunications (GSM) protocols, Code Division Multiple Access (CDMA and/or CDMA 2000) protocols and local area telecommunications protocols such as Bluetooth protocols and one or more of the IEEE 802 protocols.

Each network 11 and 13 are connected to a gateway 12, such as a PSTN/VoIP gateway. The type of gateway is dependent on which networks are present in the system. In this example, a public switched telephone network (PSTN) 11 and an IP Network 13 are present. The PSTN/VoIP gateway 12 is further connected to at least one communications terminal 14. Communications terminal 14 can be any type of terminal such as a cellular telephone, a landline telephone, a computer, and a video conferencing device. In this example, a PSTN telephone is shown at 14. At least one target communications terminal 15 is connected to gateway 12. Communications terminal 15 can be any type of terminal such as a cellular telephone, a landline telephone, a computer and a video conferencing device. In this example terminal 15 is a cellular telephone with personal mobility services attached to the contact phone number.

A call is made at communications terminal 14 and is received by the PSTN/VoIP gateway 12. PSTN/VoIP gateway 12 acts as network translator and mediator, translating calls placed through PSTN 11 into digital data packets that are compatible with the VoIP network 13.

The PSTN call is converted into digital data packets by the PSTN/VoIP gateway 12. PSTN/VoIP gateway 12 is connected to an ENUM server 16. ENUM server 16 looks up the SIP address of the called party. PSTN/VoIP gateway 12 retrieves the SIP data from ENUM server 16. PSTN/VoIP gateway 12 is further linked to called party's SIP proxy 18.

Having the SIP information, a request is made to the called party's SIP proxy 18. The called party's SIP proxy 18 is linked to a presence server 20, which maintains data regarding the status of the called party 15. The called party's SIP proxy 18 sends a request to the presence server 20, requesting the status or context of the called party. Before any context information can be sent to the calling party, the called party will screen the calling party to determine if it wants to provide context information to the calling party. SIP proxy 18 includes a screening component to allow the called party to determine if it wants to allow or limit the amount and content of the context information to be sent to the calling party.

The presence server provides context information regarding the called party (e.g., whether the called party is present, available, or is not available) to the calling party. Other context information that may be available on presence server 20 includes, but is not limited to, temporal information and spatial information. Temporal information may include the time of day and/or a time zone associated with the called party. Spatial information may include the current location of the called party. The presence server 20 accepts, stores and distributes presence information. The presence server 20 provides presence information to the SIP proxy server 18 to be stored and distributed and receives presence information from the called party's SIP agent, e.g., VoIP phone, personal computer or other device that is able to act on the called party's behalf and register itself with the presence server 20, via the SIP proxy server 18. It also provides updates on the called party's presence server 20. The called party's SIP proxy 18 sends the context information back to the PSTN/VoIP gateway 12.

A voice response unit 24 is linked to PSTN/VoIP gateway 12. PSTN/VoIP gateway 12 sends the context information to voice response unit 24, which sends the data to calling party 14. The presence information can be any of, but not limited to, the following: a) time and/or location of the called party; b) the called party is present and will accept the call; c) the called party is present, but will not accept the call; d) the called party is present, but the time is not appropriate, e.g., it is 3 A.M. in the morning where called party is located; e) the called party is present and is only taking urgent calls; f) the called party is not available at the current number, but may be reached at a different number, provided to the calling party; g) the called party is available at a different number, which calling party can be forwarded to; h) the called party is not present and is not available; and i) the called party is not available currently, but will send an invite message to calling party as soon as he becomes available. The context information may be presented by the voice response unit 24 to the calling party by voice message with menu options.

Calling party 14 has certain flexibility to decide what to do with the information. Among the many options, calling party 14 may a) put the call through to talk to called party 15; b) leave a voice mail message in called party's inbox; c) terminate the call; d) terminate the call and dial the different number where called party can be reached; e) be forwarded to the number at which called party is at. The calling party's instructions are sent to the PSTN/VoIP 12. If the instructions are to send the call through to called party 15, the call is sent to the IP Call Termination Node 26. Terminal Node 26 transforms the call data into data for the called party 15.

If the instructions are other than to send the call through, the calling party 14 directs the PSTN/VoIP 12 to either terminate the call, leave a message, or request to be forwarded to the alternative number that was provided by the called party.

Figure 2:
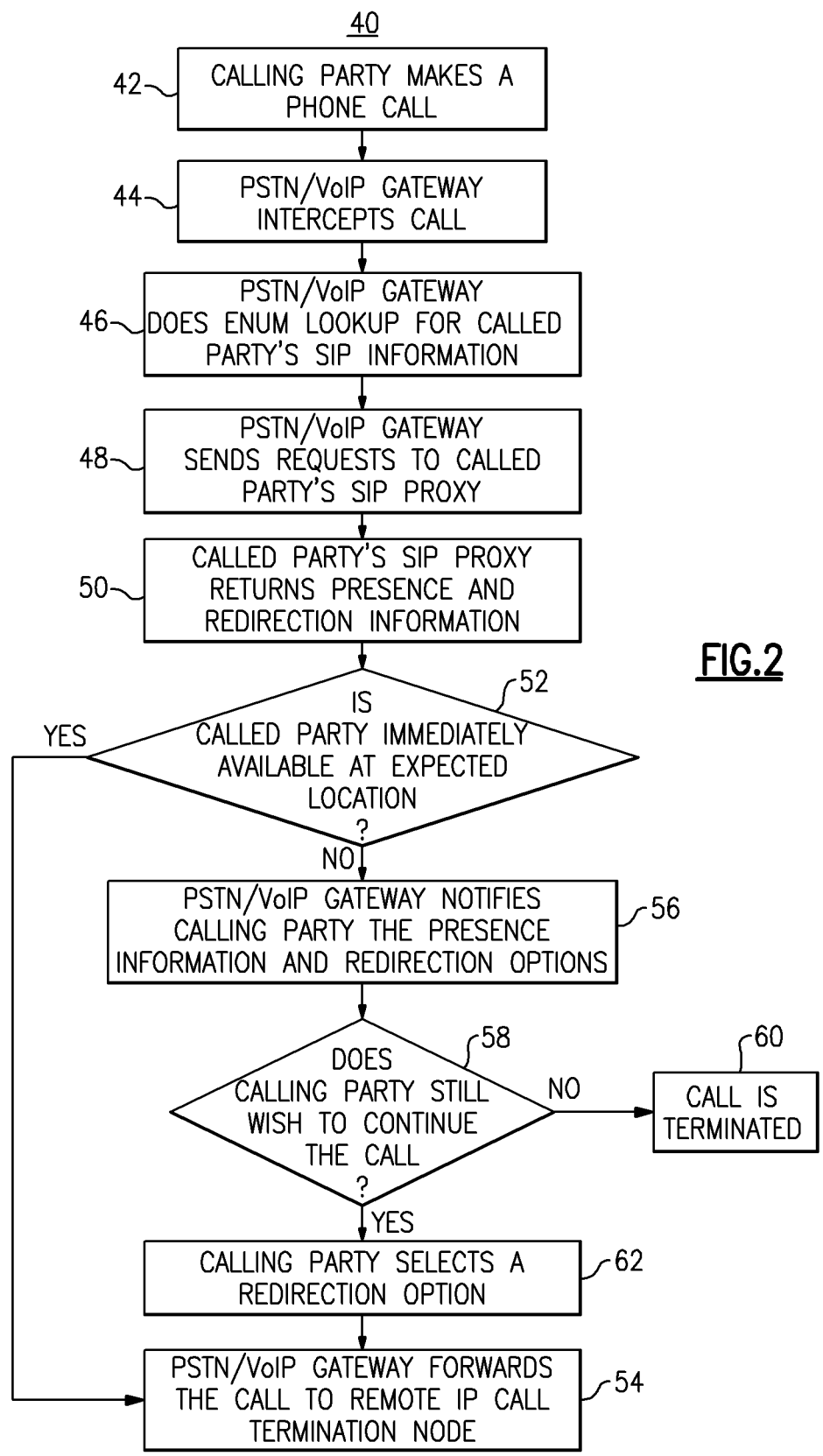
FIG. 2 shows a flow chart showing the logic of an embodiment of the system of the invention.

Reference is made to FIG. 2, which shows the logic 40 of an embodiment of a method and system herein. The method begins with the initiating of a telephone call at step 42. The PSTN/VoIP gateway intercepts the telephone call at step 44. The PSTN/VoIP gateway translates the call placed through the public switched telephone network (PSTN) into digital data packets that are compatible with an enterprise's VoIP system.

At step 46, the PSTN/VoIP gateway conducts an ENUM lookup for the called party's SIP information. Having the SIP information, the PSTN/VoIP gateway sends requests to the called party's SIP proxy at step 48. The SIP proxy returns presence and redirection information regarding the called party at step 50. At step 52, a query asks whether the called party is immediately available at the expected location. If the called party is available, the PSTN/VoIP gateway forwards the call to a remote IP call termination node at step 54 for receipt by the called party. If the called party is directly available and has not established any redirection instructions, including blocking calls for specific numbers (calling parties) then the call should just go through without intervention.

If the called party is not immediately available at step 52, the PSTN/VoIP gateway notifies the calling party the presence information and redirection options at step 56. At step 58, a query asks whether the calling party still wishes to continue the call. If not, the call is terminated at step 60. If yes, the calling party selects a redirection option at step 62.

Redirection options may include, but are not limited to, leaving a voice mail message in the called party's inbox or being forwarded to an alternate number at which called party is at, or speaking to the called party's answering service.

In a further embodiment, a method of an embodiment herein may be implemented within or between one or more computer systems, by executing computer-readable program code stored on computer-readable media. The computer-readable media may include, for example, any number or mixture of fixed or removable media (such as one or more fixed disks, random access memories (RAMs), read-only memories (ROMs), or compact discs), at either a single location or distributed over a network. The computer-readable program code may include, for example, instructions embodied in software or firmware.

The computer-readable program code may include various components, such as program code; code to screen the calling party; code to access context information associated with a called party; code to provide context information and redirection options to the calling party; code to carry out calling party instructions.

The system allows a user to make a call from a standard PSTN device that gets intercepted by a PSTN/VoIP gateway. The gateway then gets additional presence and redirection information from the called party's SIP proxy. The information is then used to generate information to the calling party via the voice response unit.

The following non-limiting example illustrates an embodiment of the invention.

EXAMPLE

Calling Party A initiates a call to Called Party B. Context information is retrieved from the SIP proxy and sent to the gateway. Calling Party A receives information that the Called Party B is currently in a hotel in Rome, Italy and the local time in Rome is 3:00 AM. Calling Party A has the option of putting the call through, terminating the call or leaving a message in the voice mail inbox of the Called Party B. Calling Party A opts to put the call through to Called Party B, since it is an emergency situation. The call is then directed to Called Party B's phone, and Party A and Party B are connected.

The specific redirection and call control behaviors will be a function of the calling party's identity and how the called party has decided to handle calls from that number. The voice response call interception can also provide information to the calling party about any potential charges that might result due to the call being redirected.

Embodiments of the system and method allow a user on a standard PSTN handset to get the extended presence information and call control that would typically only be available on more sophisticated devices, such as a smart 3G handset or a computer.

The invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended embodiments.

What is claimed is:

1. A method of routing telephone calls from a calling party to a called party comprising the steps of:
   placing a call to the called party at a first number, wherein information identifying the calling party is associated with the call;
   receiving, by the calling party, context information associated with the called party from a context information server associated with the called party, if and only if the called party has authorized the calling party to receive the context information based on the calling party's identifying information, wherein the context information received by the calling party comprises a first amount of context information about the called party, said first amount of context information comprising at least presence information of the called party, the called party's current local time, the called party's current location, and the called party's current availability, wherein said first amount of context information is dependent upon the identity of the calling party;
   subsequent to the receiving step, receiving, by the calling party, the option to perform each of the following steps, if and only if the called party has authorized the calling party to perform the following steps: (i) connecting the call to the called party, and (ii) selecting a redirection option with the call, wherein said step of selecting further comprises the steps of:
      receiving, by the calling party, a plurality of redirection options including forwarding the call to the called party's current location, receiving an alternative number of the called party to connect to, and inputting a callback number in the called party's inbox, wherein the plurality of redirection options is dependent upon the identity of the calling party;
      selecting one of the plurality of redirection options;
      receiving, by the calling party, information regarding potential charges that will be incurred by the selection; and
      receiving, by the calling party, the option to accept the potential charges or select one of the other redirection options; and
   receiving, by the calling party, the outcome of the selected redirection option.

2. The method of claim 1 further comprising:
   after placing a call with a called party, permitting the called party to receive information indicative of the calling party.

3. The method of claim 1 wherein the called party's current location information also comprises information about the length of time the called party is at the current location.

4. The method of claim 1 wherein the receiving step includes the following sub-steps:
   sending, by a voice response unit, the context information to the calling party; and
   receiving, by the calling party, the context information in the form of voice message.

5. A computer program product encoded in a non-transitory computer readable medium for being performed by a machine to instruct a system to route a telephone call from a calling party to a called party the product including the following sets of instructions:
   a first instruction set for receiving a call placed by a calling party to a called party, wherein information identifying the calling party is associated with the call;
   a second instruction set for accessing, at a context information server associated with the called party, context information associated with the called party if and only if the called party has authorized the calling party to receive the context information based on the calling party's identifying information;
   a third instruction set for sending a voice message to the calling party, with the voice message including a first amount of context information associated with the called party, wherein the first amount of context information comprises at least presence information of the called party, the called party's current local time, the called party's current location, and the called party's current availability, wherein said first amount of context information is dependent upon the identity of the calling party;
   a fourth instruction set for providing to the calling party, upon receipt of the context information, the option to perform each of the following steps, if and only if the called party has authorized the calling party to perform the following steps: (i) connecting the call to the called party, and (ii) selecting a redirection option with the call, wherein said step of selecting further comprises the steps of:
      receiving, by the calling party, a plurality of redirection options selected from the group consisting of forwarding the call to the called party's current location, receiving an alternative number of the called party to connect to, and inputting a callback number in the called party's inbox, wherein the plurality of redirection options is dependent upon the identity of the calling party;

selecting one of the plurality of redirection options;

receiving, by the calling party, information regarding potential charges that will be incurred by the selection; and receiving, by the calling party, the option to accept the potential charges or select one of the other redirection options; and a fifth instruction set for receiving, by the calling party, the outcome of the selected redirection option.

* * * * *